US007203735B1

(12) United States Patent
Le Pennec et al.

(10) Patent No.: US 7,203,735 B1
(45) Date of Patent: Apr. 10, 2007

(54) FILES TRANSFER BETWEEN A REMOTE HOME SERVER AND A LOCAL SERVER

(75) Inventors: Jean-Francois Le Pennec, Nice (FR); Alain Benayoun, Cagnes/Mer (FR); Patrick Michel, La Gaude (FR); Jacques Fieschi, Saint Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 09/659,649

(22) Filed: Sep. 12, 2000

(30) Foreign Application Priority Data

Oct. 21, 1999 (EP) .................................. 99480113

(51) Int. Cl.
*G06F 15/16* (2006.01)
(52) U.S. Cl. ........................................ 709/219; 707/10
(58) Field of Classification Search ................ 709/217, 709/219, 203; 707/200, 10, 205; 711/118, 711/124
See application file for complete search history.

(56) References Cited

U.S. PATENT DOCUMENTS

| | | | | |
|---|---|---|---|---|
| 5,799,147 A * | 8/1998 | Shannon | ........................ | 714/6 |
| 5,852,713 A * | 12/1998 | Shannon | ........................ | 714/6 |
| 5,926,624 A * | 7/1999 | Katz et al. | .................. | 709/217 |
| 5,935,207 A * | 8/1999 | Logue et al. | ................ | 709/219 |
| 6,182,141 B1 * | 1/2001 | Blum et al. | .................. | 709/227 |
| 6,272,598 B1 * | 8/2001 | Arlitt et al. | ................. | 711/133 |
| 6,330,606 B1 * | 12/2001 | Logue et al. | ................ | 709/226 |
| 6,345,266 B1 * | 2/2002 | Ganguly et al. | ............... | 707/1 |
| 6,466,970 B1 * | 10/2002 | Lee et al. | .................... | 709/217 |
| 6,516,351 B2 * | 2/2003 | Borr | ........................... | 709/229 |

* cited by examiner

*Primary Examiner*—Glenton B. Burgess
*Assistant Examiner*—Kimberly Flynn
(74) *Attorney, Agent, or Firm*—John R. Pivnichny; Dillon & Yudell LLP

(57) ABSTRACT

In a remote computer, a method for providing a file comprises the steps of receiving a request for this file, identifying this file as being stored in a distant server, requesting the distance server to send the file, identifying this file as being used, and forwarding this file. Further, in a local server, a method for transferring a file from a home server comprises the steps of receiving a request for this file, this request comprising the home server identification, checking that this file is not locally stored, requesting this file to the home server, identifying the file as being locally used, and forwarding this file.

12 Claims, 4 Drawing Sheets

US 7,203,735 B1

FILES TRANSFER BETWEEN A REMOTE HOME SERVER AND A LOCAL SERVER

BACKGROUND OF THE INVENTION

1. Technical Field

The present invention relates to files transfer between a remote server and a local server. Such a transfer is necessary when a user is temporarily connected to a local server different from a remote home server to which this user is usually connected.

2. Description of the Related Art

It is now very common that someone who travels needs to have access to a set of files, system files, data files or application files. So, this person can bring a portable computer with him, all the necessary files being stored in this computer. It is often not very convenient to carry such an equipment. Moreover, nowadays, the files of a computer user are often stored on a server, the home server. In this case, the user has to transfer all his files on the portable computer and he can forget some of these files. Thus, solutions have been developed to allow a user to access transparently to his own computer from another personal computer, generally by means of a local server.

A first method, TELNET, allows a user connected to a network with a local computer to access a remote computer such that the local computer is a terminal of the remote computer. The term TELNET refers to a remote connection on the INTERNET that is made with the TELNET protocol. When using electronic mail or FTP, a file transfer protocol, the local computer limits the interaction with the remote computer and the file management between both computers is not very practical. It is also possible to open an interactive session with TELNET. Accordingly, once the connection has been established, the local computer is transparent and the user works as if he were directly attached to the remote computer. During the session, both computers are connected, that means that access times could be long, especially when the remote computer is overburdened.

Another method is known as directory replication, a feature offered by servers equipped with MICROSOFT WINDOWS NT (registered trademark). Directory replication allows to set up and maintain identical directories on multiple stations such as servers or personal computers. Updates made to the files or directories on one server are periodically replicated to other stations in import directories. Replication is well adapted for read only files since import directories that receive copies of the files are overwritten each time replication occurs. Any modification made on a file in an import directory is lost at the next replication. Consequently, the user cannot be sure that the modifications he has made in an import directory will be saved; the saving procedure has to be done manually, by means of specific commands.

SUMMARY OF THE INVENTION

It is therefore a general object of the present invention to provide for a method which allows to access a file in a remote computer from a local computer in an efficient way and to insure that any modification of this file is saved.

According to the invention, in a remote computer, a method for providing a file comprises the following steps:
receiving a request for this file,
identifying this file as being stored in a distant server,
requesting the distant server to send the file,
identifying this file as being used, and
forwarding this file.

Besides, in a local server, a method for transferring a file from a home server comprises the following steps:
receiving a request for this file, this request comprising the home server identification,
checking that this file is not locally stored,
requesting this file to the home server,
identifying the file as being locally used, and
forwarding said file.

A method for sending back the file to the home server, wherein is stored an information according to which said file is locally stored, comprises the following steps:
receiving a request for this file, the request comprising the home server identification,
checking that the file is locally stored,
forwarding the file to the home server when it has been locally modified, and
deleting the information according to which this file is locally stored.

Advantageously, this method comprises a further step for sending an information to the home server when the file has not been locally modified.

BRIEF DESCRIPTION OF THE DRAWINGS

Embodiments of the present invention are described below by way of example only with reference to the accompanying drawings, wherein.

DETAILED DESCRIPTION OF THE INVENTION

Figure 1:
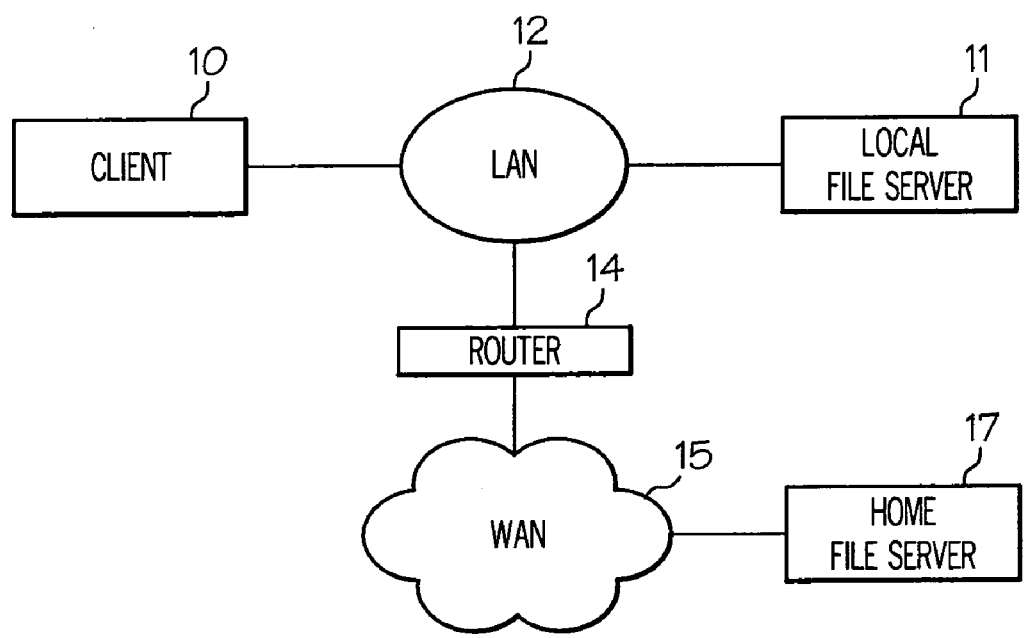
FIG. 1 represents the equipments involved in the invention.

With reference to FIG. 1, a personal computer or client 10 is connected to a local file server 11 by means of a local area network 12 itself connected to a wide area network 15, generally with a router 14. In addition, a remote home file server 17 is also connected to the wide area network 15 such as Internet either directly or through another router (not shown) and another local area network (not shown).

Figure 2:
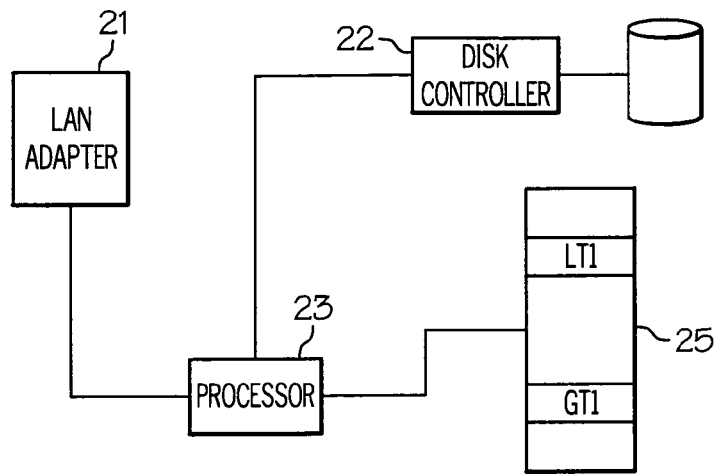
FIG. 2 represents the main components of a local file server.

With reference to FIG. 2, the local file server 11 comprises a first LAN adapter, 21 where LAN means "Local Area Network". This adapter is used to transmit and receive messages on the network with the client 10 and with the home file server 17. Another component of the local file server 11 is a first disk controller 22 such as a SCSI adapter (SCSI for "Small Computer System interface") or a RAID adapter (RAID for "Redundant Array of Inexpensive Disks"). The local server also comprises a first processor 23 to perform the method which will be described further.

The local file server 11 comprises in addition a first memory 25 which includes two specific tables, the local client table LT1 and the guest client table GT1. Each entry in these tables corresponds to a user and gives a pointer on one directory called the directory file.

Figure 3:
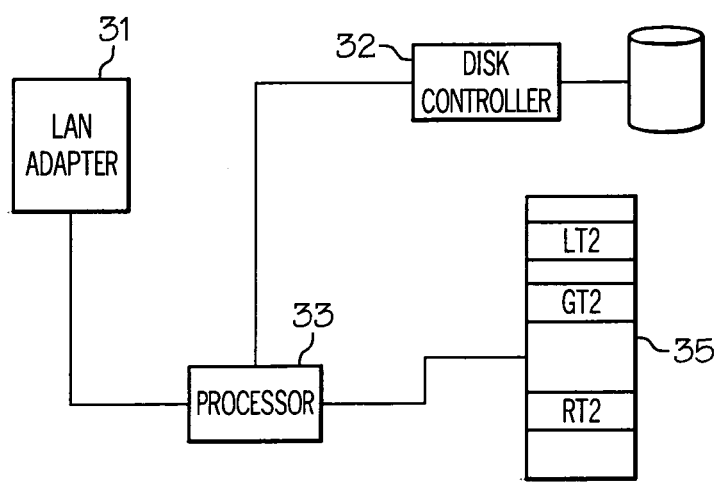
FIG. 3 represents the main components of a home file server.

With reference to FIG. 3, the remote home file server 17 is very similar to the local file server 11. It comprises a second LAN adapter 31, a second disk controller 32, a second processor 33 and a second memory 35. This memory includes also a local client table LT2, a guest client table GT2 and it further includes a remotely logged client table RT2.

Figure 4:
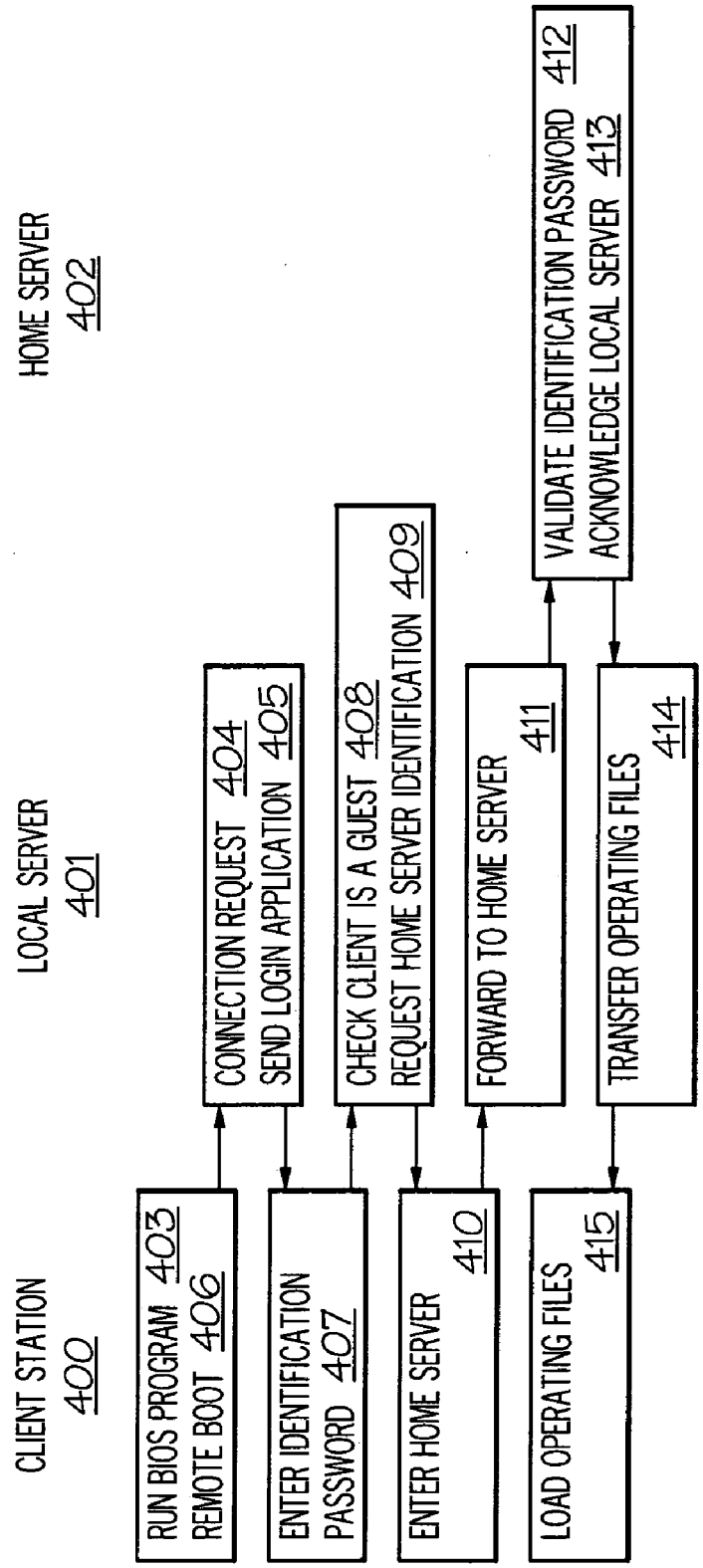
FIG. 4 is a diagram showing the messages exchange between the client, the local server and the home server.

With reference to FIG. 4, a file transfer between the home file server 17-402 and the client 10-400 will now be described. There is a set of messages between the client and the local server 11-401 and another set of messages between the local server and the home server. There is no direct exchange between the client 400 and the home server 402.

When the client or personal computer 400 is powered on, it first runs the BIOS program 403 stored in a read only memory located in a LAN adapter. The BIOS program performs a remote boot 406 on the local file server 401, using any usual protocol such as DHCP ("Dynamic Host Configuration Protocol") or BOOTP ("Bootstrap protocol"). The BIOS program sends a Connection request 404 to the local server 401 which sends back a login application 405. The adapter of the personal computer 400 uses a file transfer protocol such as TFTP ("Trivial File Transfer Protocol"), FTP ("File Transfer Protocol"), or CIFS ("Common Investment File System") for downloading this login file from the local server 401. Subsequently, the personal computer 400 runs the login file which prompts a user of this computer to enter a user identification and eventually a password 407. The local file server 401 checks whether the user is one of its clients or not referring to the first local client table LT1 408. Assuming the user is not one of its clients and is a guest, this user should be stored in the guest client table GT1 if this not already done. The local server now requests the user to enter a home file server identification 409–410. When this identification is received, the local server forwards 411 the client request to the home file server 402. In response, the home server checks 412 that the user is one of its clients (referring to the second local client table LT2 for instance) and acknowledges 413 the local server to accept this user. In addition, the home server informs the local server of the operating system files needed for this user. Usually, most of these files are available at the local server and therefore need not to be transferred between both servers. Eventually, the home server sends a file including user specific data. The local server can transfer the operating files to the client station 414 and the personal computer 400 can perform the loading of the operating system 415.

Additional information on Internet protocols can be found in a IBM Company publication entitled: TCP/IP tutorial and technical overview GG24-3376-05, October 1998, edited by the International Technical Support Organization.

Figure 5:
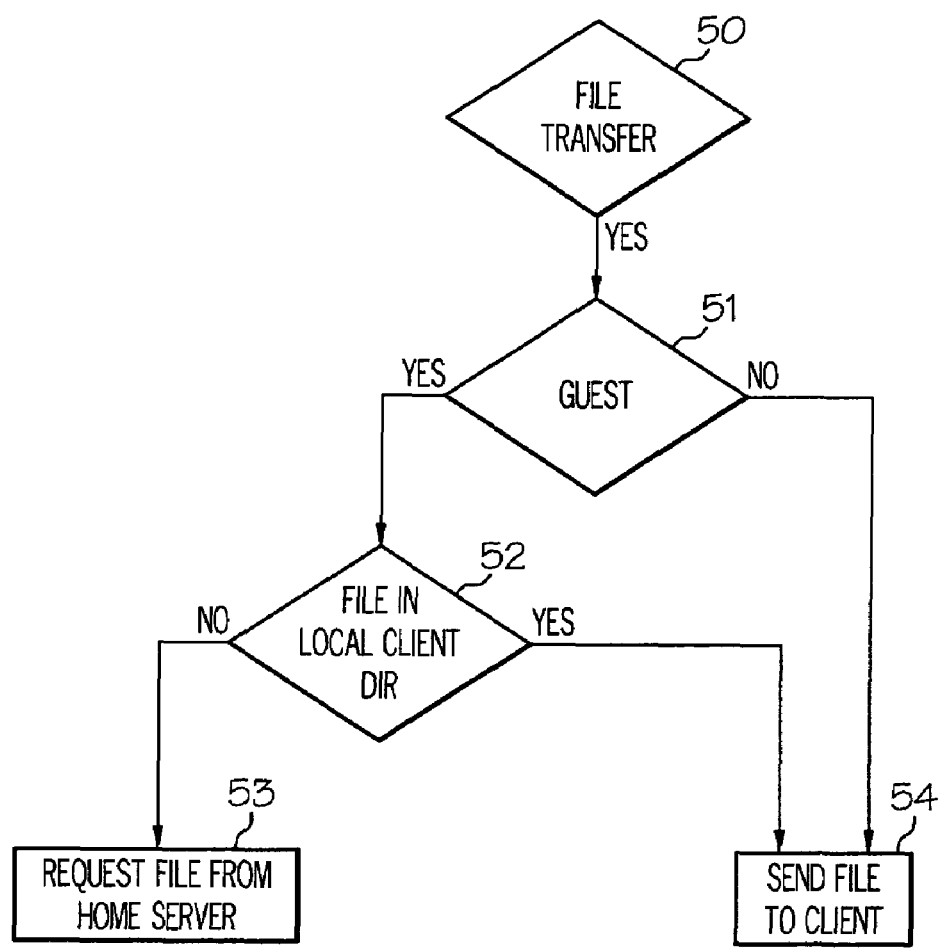
FIG. 5 is a flow chart of the method used in the local server.

With reference to FIG. 5, a first transfer 50 is now described from the local server. First, a test 51 determines whether the client (user) using the client station is a guest or a local known client.

If the client is a local known user ("no" answer), the requested file is simply transmitted to the client 54.

If the client is a guest and requests a new file transfer, the local server first checks 52 whether the file is in the local client directory or not by means of the guest client table GT1.

If the file is in the local server ("yes" answer), the local server sends the file to the client 54.

If the file is not in the local server ("no" answer), the local server requests the file from the home server 53, stores this file in its memory and its identification in the guest client table, and then forwards the file to the client. The files modifications made by the client on the personal computer are saved in the local server. Moreover, an indication that the file has been modified is stored in the guest client table.

According to an optional feature, this indication is also forwarded to the home server.

On the other hand, when this file is requested by the home server, the local server checks whether it has been modified or not.

If the file has not been modified (answer "no"), this information is forwarded to the home server.

If the file has been modified (answer "yes"), the modified file is forwarded to the home server. In any case, the file is deleted and the identification of this file is removed from the guest client table GT1.

In the home file server 17, when a file has been requested by a first local server, or when according to the above mentioned optional feature a file is modified in this local server, a corresponding information is stored in the remotely logged client table RT2 together with the identification of the local server. Thus, when later this file is requested again by the user from another server or from the home server itself, the home server first checks if it appears in the remotely logged client table RT2. If it is the case, this file is first requested from the local server identified in the table RT2 and it is overwritten on the version stored in the home server. The information according to which the file is in the first local server is then deleted in the remotely logged client table RT2.

It then appears that the latest version of the file is always available, either in the home server or in a server identified in a table of the home server.

The scope of the present invention is in no way limited to the above embodiments. In particular, any means or steps could be replaced by equivalent means, respectively steps.

What is claimed is:

1. A method of providing a user associated with a remote home server with access to a file via a plurality of local servers, said method comprising:
   receiving a first request for said file at said remote home server from said user via a first local server of said plurality of local servers;
   identifying a second local server of said plurality of local servers utilizing data of an entry corresponding to said file within a remotely logged table associated with said remote home server;
   providing said file to said user via said first local server in response to said identifying, wherein said providing comprises
      issuing a second request for said file to said second local server from said remote home server,
      receiving a response to said second request from said second local server, wherein said response to said second request comprises,
         said file in response to a determination that said file was modified at said second local server, and
         data of an entry corresponding to said file within a guest client table associated with said second local server in response to a determination that said file was not modified at said second local server; and
   deleting said data of said entry corresponding to said file within said remotely logged table in response to said providing.

2. The method of claim 1, said method further comprising:
   deleting said file and said data of said entry corresponding to said file within said guest client table associated with said second local server in response to said providing.

3. The method of claim 1, wherein
   said method further comprises receiving data at said remote home server indicating said file has been modified at said second local server, and said identifying comprises identifying said second local server in response to a receipt of said data at said remote home server indicating said file has been modified at said second local server.

4. The method of claim 1, wherein said method further comprises storing a first version of said file at the remote home server, and said providing comprises providing said file to said user via said first local server in response to said storing.

5. The method of claim 4, wherein said providing comprises:

providing said first version of said file in response to a determination that said file was not modified at said second local server.

6. The method of claim 4, wherein said response comprises a second version of said file in response to a determination that said file was modified at said second local server, and said providing comprises overwriting said first version of said file with said second version of said file at said remote home server, and providing said second version of said file in response to said overwriting.

7. A remote home server data processing system for providing an associated user with access to a file via a plurality of local servers, said remote home server data processing system comprising:

means for receiving a first request for said file from said associated user via a first local server of said plurality of local servers;

means for storing a remotely logged table;

means for identifying a second local server of said plurality of local servers utilizing data of an entry corresponding to said file within said remotely logged table;

means for providing said file to said user via said first local server in response to an identification of said second local server, wherein said means for providing comprises means for issuing a second request for said file to said second local server, means for receiving a response to said second request from said second local server, wherein said response to said second request comprises, said file in response to a determination that said file was modified at said second local server, and data of an entry corresponding to said file within a guest client table associated with said second local server in response to a determination that said file was not modified at said second local server; and means for deleting said data of said entry corresponding to said file within said remotely logged table in response to a provision of said file to said user.

8. The remote home server data processing system of claim 7, further comprising: means for deleting said file and said data of said entry corresponding to said file within said guest client table associated with said second local server in response to a provision of said file to said user.

9. The remote home server data processing system of claim 7, wherein said remote home server data processing system further comprises means for receiving data indicating said file has been modified at said second local server, and said means for identifying comprises means for identifying said second local server in response to a receipt of said data indicating said file has been modified at said second local server.

10. The remote home server data processing system of claim 7, wherein said remote home server data processing system further comprises means for storing a first version of said file, and said means for providing comprises means for providing said file to said user via said first local server in response to a storage of said first version of said file.

11. The remote home server data processing system of claim 10, wherein said means for providing comprises:

means for providing said first version of said file in response to a determination that said file was not modified at said second local server.

12. The remote home server data processing system of claim 10, wherein said response comprises a second version of said file in response to a determination that said file was modified at said second local server, and said means for providing comprises means for overwriting said first version of said file with said second version of said file, and means for providing said second version of said file.

* * * * *